United States Patent
Kyung et al.

(10) Patent No.: US 10,649,116 B2
(45) Date of Patent: May 12, 2020

(54) AUTO FOCUSING DEVICE

(71) Applicant: ELECTRONICS AND TELECOMMUNICATIONS RESEARCH INSTITUTE, Daejeon (KR)

(72) Inventors: Ki-Uk Kyung, Daejeon (KR); Bong Je Park, Daejeon (KR); Sang-Youn Kim, Seoul (KR); Sae Kwang Nam, Daejeon (KR); Sun Tak Park, Incheon (KR); Sung Ryul Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/982,712

(22) Filed: May 17, 2018

(65) Prior Publication Data
US 2018/0267215 A1    Sep. 20, 2018

Related U.S. Application Data

(62) Division of application No. 15/203,742, filed on Jul. 6, 2016, now Pat. No. 10,007,034.

(30) Foreign Application Priority Data

Sep. 9, 2015  (KR) .................. 10-2015-0127607
Mar. 18, 2016  (KR) .................. 10-2016-0032657

(51) Int. Cl.
*G02B 1/06* (2006.01)
*G02B 3/12* (2006.01)
*G02C 7/02* (2006.01)
*G02F 1/29* (2006.01)
(Continued)

(52) U.S. Cl.
CPC ............. *G02B 3/12* (2013.01); *G02B 1/06* (2013.01); *G02B 7/09* (2013.01); *G02C 7/081* (2013.01); *G02C 7/085* (2013.01); *G02F 1/29* (2013.01); *G02C 7/088* (2013.01);
(Continued)

(58) Field of Classification Search
CPC ........ G02C 7/022; G02C 7/085; G02C 7/081; G02C 7/083; G02C 7/09; G02C 7/10; G02C 7/105; G02B 3/12; G02B 3/14; G02B 1/06
USPC .................. 351/159.34, 159.39, 159.68; 359/665–667
See application file for complete search history.

(56) References Cited

U.S. PATENT DOCUMENTS 6,459,535 B1 * 10/2002 Goto ..................... G02B 3/14
359/666
2002/0118464 A1   8/2002 Nishioka et al.
(Continued)

FOREIGN PATENT DOCUMENTS

JP        2011133210 A        7/2011
KR   10-2009-0081124 A     7/2009
(Continued)

*Primary Examiner* — Darryl J Collins
(74) *Attorney, Agent, or Firm* — Rabin & Berdo, P.C.

(57) ABSTRACT

An auto focusing lens includes an active lens including a lens body including electroactive polymer and a transparent electrode at least partially coated on a surface of the lens body, and a controller controlling the focus of the active lens by applying a voltage to the transparent electrode.

11 Claims, 16 Drawing Sheets

(51) Int. Cl.
*G02C 7/08* (2006.01)
*G02B 7/09* (2006.01)

(52) U.S. Cl.
CPC .... *G02F 2001/294* (2013.01); *G02F 2201/12* (2013.01); *G02F 2202/022* (2013.01)

(56) References Cited

U.S. PATENT DOCUMENTS

| | | | |
|---|---|---|---|
| 2006/0119218 A1* | 6/2006 | Doshida | G02B 3/12 |
| | | | 310/323.01 |
| 2007/0279732 A1 | 12/2007 | Kosaka et al. | |
| 2010/0208194 A1 | 8/2010 | Gupta et al. | |
| 2010/0231783 A1 | 9/2010 | Bueler et al. | |
| 2011/0149410 A1* | 6/2011 | Blum | G02B 3/14 |
| | | | 359/666 |
| 2015/0036474 A1 | 2/2015 | Nam et al. | |
| 2015/0043094 A1 | 2/2015 | Kyung et al. | |

FOREIGN PATENT DOCUMENTS

| | | |
|---|---|---|
| KR | 10-0935830 B1 | 1/2010 |
| KR | 1020150018924 A | 2/2015 |

* cited by examiner

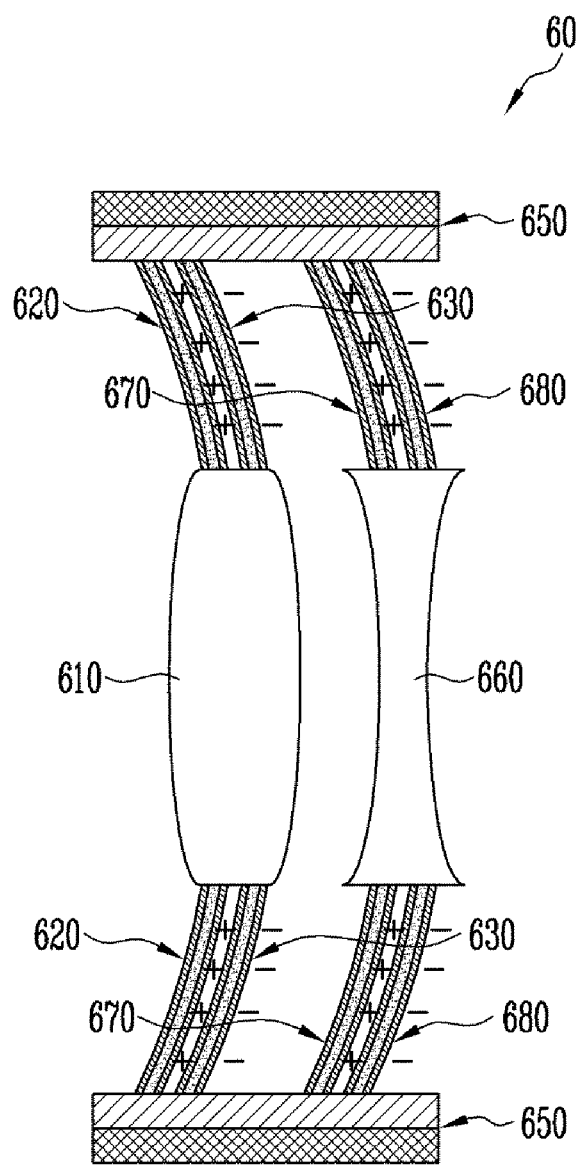

AUTO FOCUSING DEVICE

CROSS-REFERENCE TO RELATED APPLICATION

This is a divisional of co-pending U.S. application Ser. No. 15/203,742, filed on Jul. 6, 2016. Further, this application claims priority to Korean Patent Application Numbers 10-2015-0127607 filed on Sep. 9, 2015 and 10-2016-0032657 filed on Mar. 18, 2016, in the Korean Intellectual Property Office, the entire disclosure of which is incorporated by reference herein.

BACKGROUND

1. Field

An aspect of the present disclosure relates to an auto focusing device, and more particularly, to an auto focusing device including an active lens.

2. Description of the Related Art

Lenses have been applied to various devices such as glasses, telescopes, microscopes, cameras, and endoscopes. In the case of glasses, the glasses may be generally classified into glasses for long-sightedness, which have concave lenses such that an object at a long distance can be well viewed therethrough, and glasses for short-sightedness, which have convex lenses such that an object at a short distance can be well viewed therethrough.

Typical glasses use single-focus lenses of which focuses are not changed, such as plastic lenses or glass lenses. In the case of single-focus glasses, a person having both short-sightedness and long-sightedness should replace the glasses depending on a situation. For example, in the case of an elderly person, the elderly person should frequently replace single-focus glasses for long-sightedness or short-sightedness when necessary. Accordingly, a double-focus lens has been developed to solve such inconvenience.

The double-focus lens is formed by implementing, as one lens, a lens for long-sightedness and a lens for short-sightedness. The one lens includes a portion having a focus at which an object at a long distance can be viewed and a portion having a focus at which an object at a short distance can be viewed, and enables a person to select a focus according to the position of a person's pupil. However, since only two focuses exist in the double-focus lens, there is a problem in that an object at a middle distance is not well viewed even though objects at long and short distances are well viewed. In order to solve this problem, an accumulated multi-focus lens having multiple focuses has been developed.

The accumulated multi-focus lens is configured to have multiple focuses, and thus its prescription is changed depending on a focal position of an eye. Further, it is possible to ensure clear sight regardless of long, middle, and short distances. However, the accumulated multi-focus lens is expensive, and has a different method for viewing an object therethrough from the existing lenses. Therefore, training is required for a person to become accustomed to the accumulated multi-focus lens. When the person does not become accustomed to the accumulated multi-focus lens, dizziness, etc. may be caused.

Each of the single-focus lens, the double-focus lens, and the accumulated multi-focus lens is a passive lens using the focus of a fixed lens. That is, the focus of the lens is not changed, and an eye should be adapted to the focus of the fixed lens. Accordingly, an active lens has been developed to solve problems of the passive lenses. The active lens refers to a lens of which focus is changeable. In early years, there was developed a liquid lens formed by injecting liquid such as liquid crystals into a fixed frame.

The shape of the liquid lens cannot be maintained by itself, and therefore, the focus of the liquid lens is actively changed by injecting liquid crystals into a fixed frame and deforming the frame. If the thickness of a piezoelectric element connected to the frame is increased by applying a voltage to the piezoelectric element, the liquid lens is changed to a convex lens through which an object at a short distance can be well viewed. If the thickness of the piezoelectric element is decreased by applying a reverse voltage to the piezoelectric element, the liquid lens is changed to a concave lens through which an object at a long distance can be well viewed. However, the upper and lower shapes of the liquid lens may be different from each other, and therefore, the focus of an image is not accurately formed. In addition, the liquid or piezoelectric element is high-priced, and therefore, manufacturing cost increases.

SUMMARY

Embodiments provide an auto focusing device capable of implementing the variable focus of a lens, such an active glasses or an active magnifier.

Embodiments also provide an auto focusing device in which an inclination or distance is measured using a sensor, thereby automatically changing the focus of a lens.

According to an aspect of the present disclosure, there is provided an auto focusing device including: an active lens including a lens body including electroactive polymer and a transparent electrode at least partially coated on a surface of the lens body; and a controller controlling the focus of the active lens by applying a voltage to the transparent electrode.

According to an aspect of the present disclosure, there is provided an auto focusing device including: at least one lens; a variable frame including a variable body supporting the at least one lens, the variable body including electroactive polymer, and a transparent electrode at least partially coated on a surface of the variable body; and a controller controlling the focus of the lens by applying a voltage to the transparent electrode.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 12A is a sectional view illustrating a state in which the active lens of FIG. 11B is moved backward.

DETAILED DESCRIPTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1:
FIG. 1 is a block diagram illustrating an embodiment of the present disclosure.

FIG. 1 is a block diagram illustrating an auto focusing device according to an embodiment of the present disclosure.

Referring to FIG. 1, the auto focusing device according to the embodiment of the present disclosure includes an active lens 20 and a controller 11 for controlling the focus of the active lens 20. The shape of the active lens 20 is changed depending on a voltage applied by the controller 11, and accordingly, the focus of the active lens 20 can be changed.

Figure 2A:
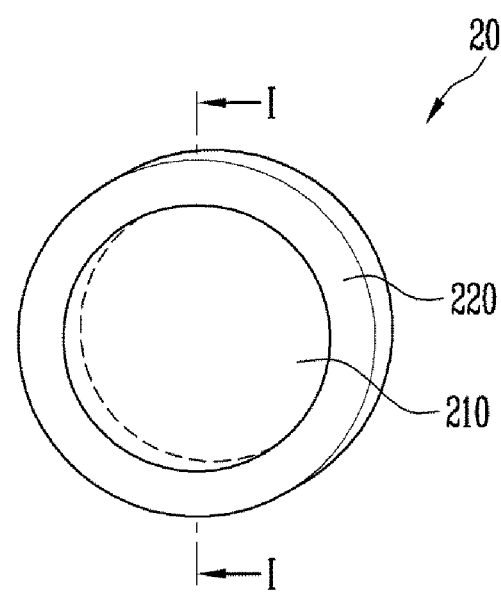
FIG. 2A is a perspective view illustrating an active lens in the embodiment of FIG. 1.
Figure 2B:
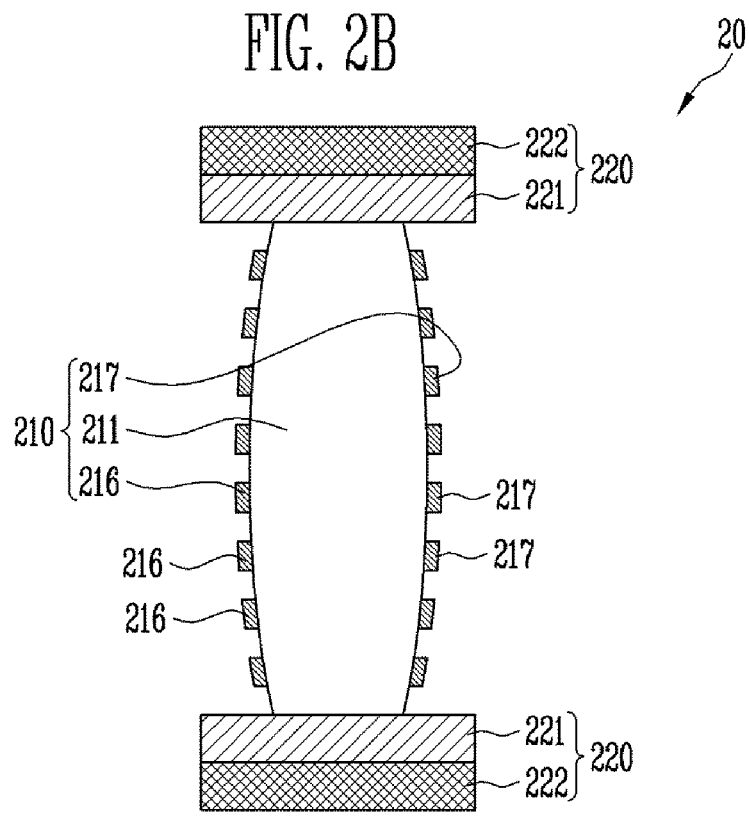
FIG. 2B is a sectional view taken along line I-I of FIG. 2A.

FIG. 2A is a perspective view illustrating the active lens according to the embodiment of the present disclosure, and FIG. 2B is a sectional view taken along line I-I of FIG. 2A.

Referring to FIGS. 2A and 2B, the active lens 20 includes a lens frame 220 and a lens 210 supported by the lens frame 220.

The lens 210 includes a lens body 211 and transparent electrodes 216 and 217 coated on surfaces of the lens body 211. The lens body 211 is a circular transparent element having a predetermined thickness. The lens body 211 is made of a flexible material. For example, the lens body 211 may include electroactive polymer. Specifically, the electroactive polymer may include, for example, polydimethylsiloxane (PDMS). The electroactive polymer refers to polymer of which shape or size is changed in an electric field. The electroactive polymer is known in the art, and therefore, its detailed description will be omitted.

The lens body 211 is a lens-shaped element having both surfaces. When the surfaces facing left and right sides are respectively referred to as front and rear surfaces for convenience of illustration, the lens body 211 has the front and rear surfaces spaced apart from each other in the thickness direction thereof. Hereinafter, one and the other surfaces of a lens body will be respectively referred to as front and rear surfaces for convenience of illustration.

Although the lens body 211 is formed in a circular shape, the present disclosure is not limited thereto, and the lens body 211 may have an outline having various shapes when necessary. For example, when the auto focusing device according to the embodiment of the present disclosure is glasses, the shape of the lens body 211 may be identical to that of a glasses frame of the glasses. Although it is illustrated that the basic shape of the lens body 211 is that of a convex lens, the present disclosure is not limited thereto. The basic shape of the lens body 211 may be that of a planar lens or concave lens. Here, the basic shape of the lens body 211 refers to a shape of the lens body in a state in which a voltage is not applied to the transparent electrodes.

The transparent electrodes 216 and 217 include a front transparent electrode 216 located on the front surface of the lens body 211 and a rear transparent electrode 217 located on the rear surface of the lens body 211. The front and rear transparent electrodes 216 and 217 are insulated from each other. The front and rear transparent electrodes 216 and 217 are electrically connected to the controller 11. Thus, a voltage can be independently applied to the front and rear transparent electrodes 216 and 217 by the controller 11, and an electric field is formed according to the applied voltage, thereby deforming the lens 210.

The front transparent electrode 216 is provided in plurality, and the plurality of front transparent electrodes 216 are partially coated on the front surface of the lens body 211. The plurality of front transparent electrodes 216 are spaced apart from each other such that a voltage can be independently applied thereto. If the plurality of front transparent electrodes 216 are partially located on the front surface of the lens body 211, the intensities of voltages applied to the respective front transparent electrodes 216 may be controlled differently from each other. Thus, a local shape of the lens body 211 can be controlled.

However, the shape of the transparent electrodes 216 and 217 shown in FIG. 2B is merely an embodiment, and the present disclosure is not limited thereto. The shape and arrangement of the transparent electrodes 216 and 217 may be variously modified. For example, the front transparent electrode 216 may be one transparent electrode entirely covering the front surface of the lens body 211.

Like the front transparent electrode 216, the rear transparent electrode 216 is provided in plurality, and the plurality of rear transparent electrodes 216 are partially coated on the rear surface of the lens body 211. However, the present disclosure is not limited thereto, and, like the front transparent electrode 216, the rear transparent electrode 216 may be one transparent electrode entirely covering the rear surface of the lens body 211.

The transparent electrodes 216 and 217 are made of a transparent conductive material. The material of the transparent electrodes 216 and 217 may be selected from transparent and flexible conductive materials. For example, the transparent electrodes 216 and 217 may include at least one of silver nano-wire, graphene, and indium tin oxide.

The lens frame 220 is a frame that surrounds the edge of the lens body 211 and fixes and supports the lens 210. The lens frame 220 includes a ring-shaped frame body 222 forming the external appearance thereof and an insulating frame 221 provided between the frame body 222 and the lens 210.

The insulating frame 221 is an insulator surrounding the edge of the lens 210. The lens frame 220 and the lens 210 are insulated from each other by the insulating frame 221. The insulating frame 221 fixes the lens 210 to the frame body 222, and is made of a flexible insulating material. For example, the insulating frame 221 may be a gasket made of a rubber material. Alternatively, the insulating frame 221 may be an insulating layer coated on an inner surface of the frame body 222, i.e., a surface facing the edge of the lens 210 among the surfaces of the frame body 222.

Figure 3A:
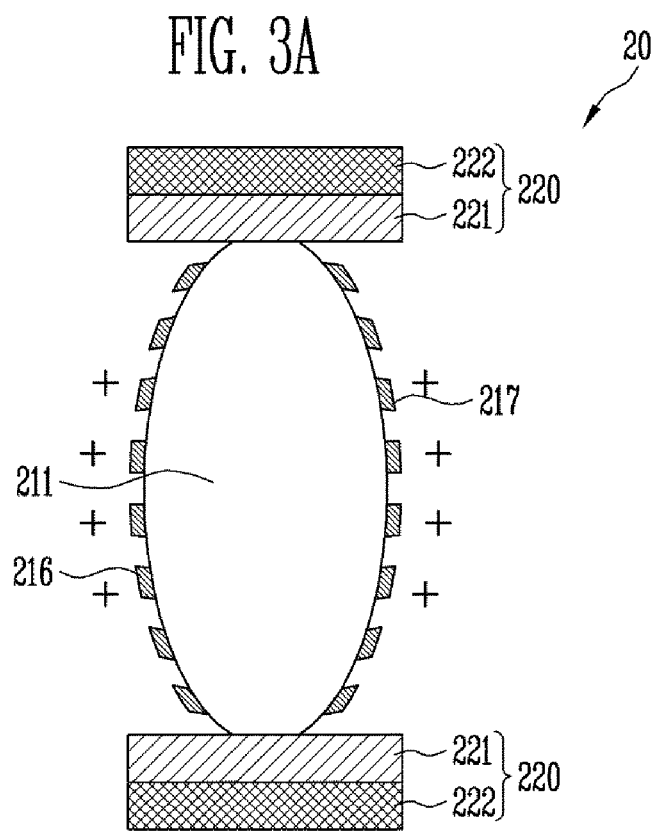
FIG. 3A is a sectional view illustrating a state in which the active lens in the embodiment of FIG. 1 is changed to a convex lens.
Figure 3B:
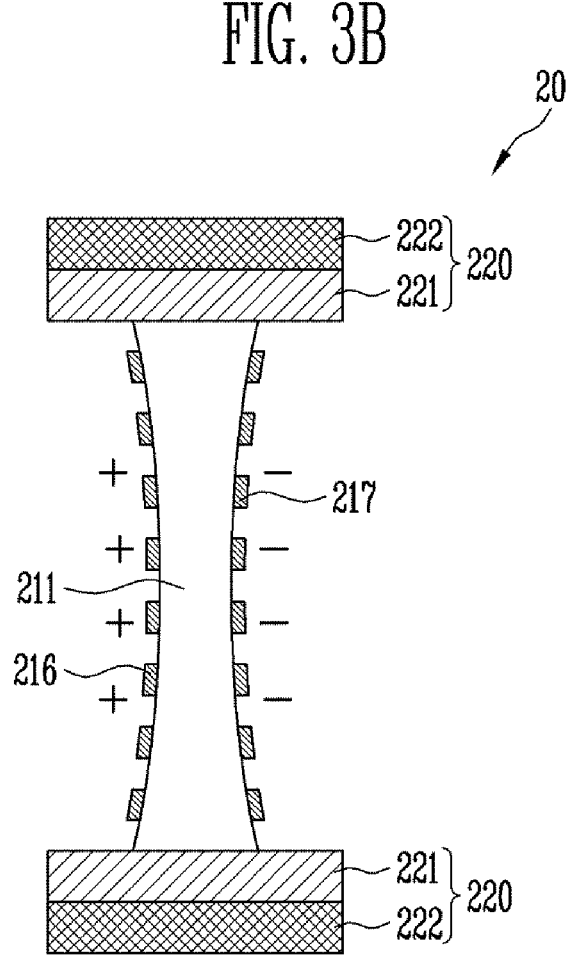
FIG. 3B is a sectional view illustrating a state in which the active lens in the embodiment of FIG. 1 is changed to a concave lens.

FIGS. 3A and 3B are sectional views illustrating a driving principle of the active lens according to the embodiment of the present disclosure, which show operation state views illustrating states in which the focus of the active lens 20 is controlled by the controller 11.

Referring to FIG. 3A, the controller 11 may apply a voltage such that the front and rear transparent electrodes 216 and 217 have the same electric charge. For example, the controller 11 may apply a voltage such that both the front and rear transparent electrodes 216 and 217 may have a positive electric charge (+) or a negative electric charge (−). In this case, the lens 20 has the shape of a convex lens due to a repulsive force between the front and rear transparent electrodes 216 and 217 respectively located at both sides of the lens body 211.

Also, the controller 11 may independently apply a voltage to the plurality of front transparent electrodes 216 and the plurality of rear transparent electrodes 217. For example, the controller 11 may apply a voltage such that the intensity of the voltage applied to the transparent electrodes 216 and 217 located at a central portion of the lens body 211 is greater than that of the voltage applied to the transparent electrodes 216 and 217 located at the periphery of the lens body 211. In this case, the repulsive force applied to the central portion of the lens body 211 has a greater value than that applied to the periphery of the lens body 211, and thus the thickness of the central portion of the convex lens can be increased.

Referring to FIG. 3B, the controller 11 may apply a voltage such that the front and rear transparent electrodes 216 and 217 have different electric charges. For example, the controller 11 may apply a voltage such that the front transparent electrode 216 has the positive electric charge (+) and the rear transparent electrode 217 has the negative electric charge (−). Alternatively, the controller 11 may apply a voltage such that the front transparent electrode 216 has the negative electric charge (−) and the rear transparent electrode 217 has the positive electric charge (+). In this case, the lens 20 has the shape of a concave lens due to an attractive force between the front and rear transparent electrodes 216 and 217 respectively located at both sides of the lens body 211.

Also, the controller 11 may independently apply a voltage to the plurality of front transparent electrodes 216 and the plurality of rear transparent electrodes 217. For example, the controller 11 may apply a voltage such that the intensity of the voltage applied to the transparent electrodes 216 and 217 located at the central portion of the lens body 211 is greater than that of the voltage applied to the transparent electrodes 216 and 217 located at the periphery of the lens body 211. In this case, the attractive force applied to the central portion of the lens body 211 has a greater value than that applied to the periphery of the lens body 211, and thus the thickness of the central portion of the convex lens can be decreased.

The degree in which the shape of the lens body 211 is changed to that of the convex lens or the degree in which the shape of the lens body 211 is changed to that of the concave lens can be controlled by independently adjusting the magnitudes of voltages respectively applied to the front and rear transparent electrodes 216 and 217 or the polarities of electric charges of the front and rear transparent electrodes 216 and 217. Further, the intensity of the voltage applied to each of the plurality of front transparent electrodes and the plurality of rear transparent electrodes is controlled to be changed depending on a position of the lens body 211 as described above, thereby changing the intensity of the attractive force or repulsive force partially acting on the lens body 211. Thus, it is possible to change the shape of the lens body 211 to various shapes depending on purposes.

Figure 4A:
FIG. 4A is a block diagram illustrating another embodiment of the present disclosure.
Figure 4B:
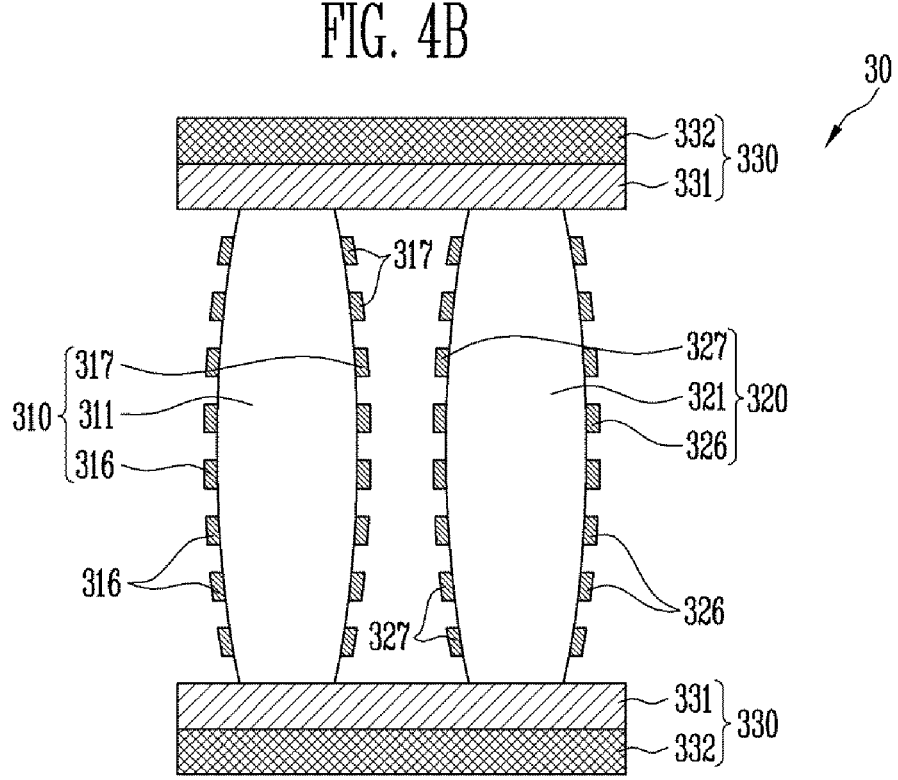
FIG. 4B is a sectional view of an active lens in the embodiment of FIG. 4A.

FIG. 4A is a block diagram illustrating an auto focusing device according to another embodiment of the present disclosure, and FIG. 4B is a sectional view of an active lens. In the above-described embodiment, the case where the active lens 20 includes one lens body has been described. However, in this embodiment, a case where an active lens 30 includes a plurality of lens bodies will be described.

Referring to FIGS. 4A and 4B, the auto focusing device according to the embodiment of the present disclosure includes the active lens 30 and a controller 12 for controlling the focus of the active lens 30. The active lens 30 includes a plurality of lenses 310 and 320 and a lens frame 330 for simultaneously fixing and supporting the plurality of lenses 310 and 320.

The plurality of lenses 310 and 320 include a first lens 310 and a second lens 320, of which focuses are independently controlled by the controller 12. Each of the first and second lenses 310 and 320 may have the substantially same configuration as the lens 210 described in FIG. 2B.

The first lens 310 includes a first lens body 311 and first transparent electrodes 316 and 317 coated on surfaces of the first lens body 311. The first transparent electrodes 316 and 317 include a first front transparent electrode 316 and a first rear transparent electrode 317. The first lens body 311, the first front transparent electrode 316, and the first rear transparent electrode 317 may have the substantially same configurations as the lens body 211, the front transparent electrode 216, and the rear transparent electrode 217 of the lens 210 described in FIG. 2b, respectively, and therefore, their detailed descriptions will be omitted.

The second lens 320 includes a second lens body 321 and second transparent electrodes 326 and 327 coated on surfaces of the second lens body 321. The second transparent electrodes 326 and 327 include a second front transparent electrode 326 and a second rear transparent electrode 327. The second lens body 321, the second front transparent electrode 326, and the second rear transparent electrode 327 may have the substantially same configurations as the lens body 211, the front transparent electrode 216, and the rear transparent electrode 217 of the lens 210 described in FIG. 2b, respectively, and therefore, their detailed descriptions will be omitted.

The first lens 310 and the second lens 320 are arranged to have the same optical axis. The optical axis is parallel to the front-rear direction when left and right sides of FIG. 4 are referred to as the front and rear, respectively. The first lens 310 and the second lens 320 are arranged such that their edges fixed to the lens frame 330 are spaced apart from each other.

The lens frame 330 may be a frame for simultaneously fixing the first and second lenses 310 and 320. The lens frame 330 includes a frame body 332 and an insulating frame 331. Except that the number of lenses fixed to the lens frame 330 is increased, the frame body 332 and the insulating frame 331 are substantially identical to the frame body 222 and the insulating frame 221, described in FIG. 2B, respectively, and therefore, their detailed descriptions will be omitted.

Figure 5A:
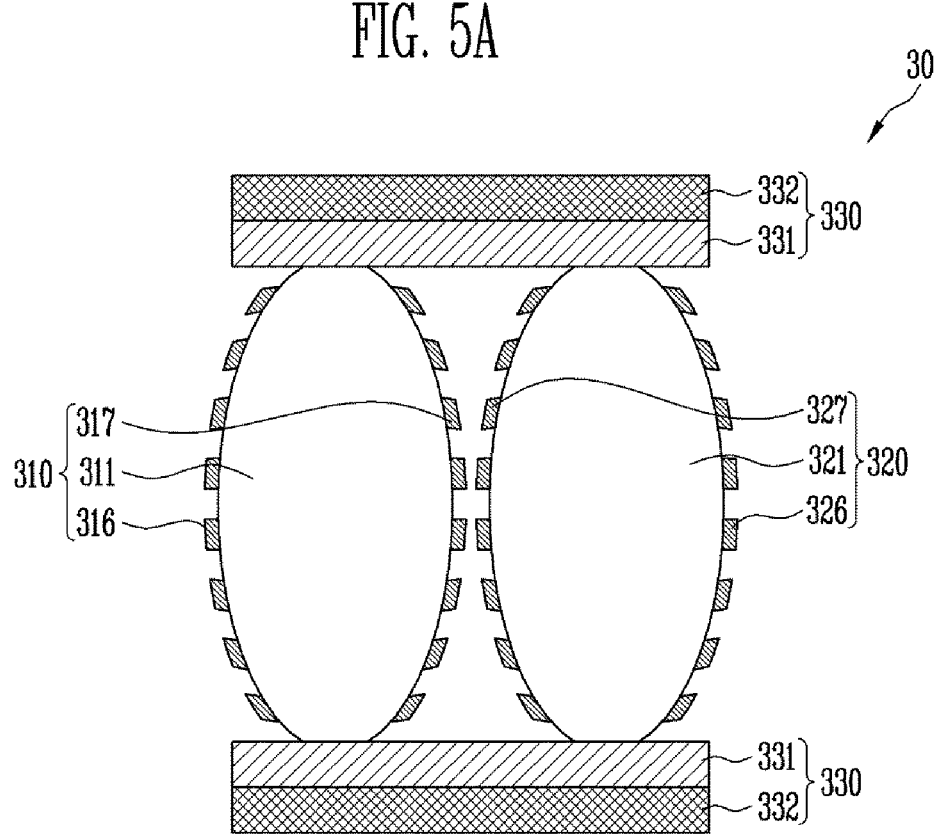
FIG. 5A is a sectional view illustrating a state in which the active lens in the embodiment of FIG. 4A is changed to two convex lenses having the same thickness.
Figure 5B:
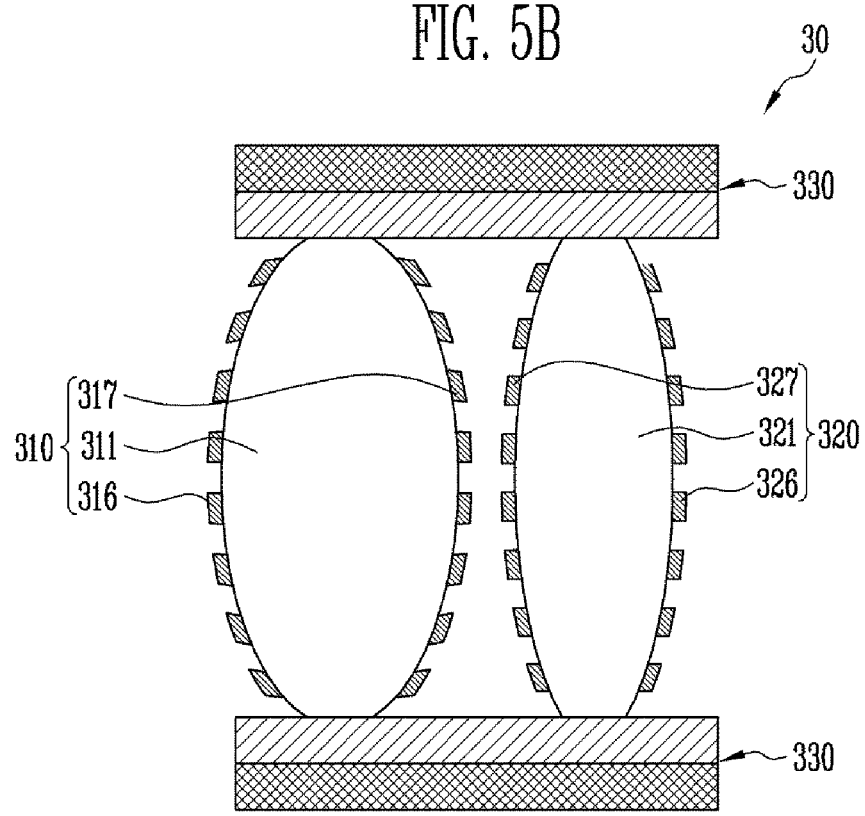
FIG. 5B is a sectional view illustrating a state in which the active lens in the embodiment of FIG. 4A is changed to two convex lenses having different thicknesses.
Figure 5C:
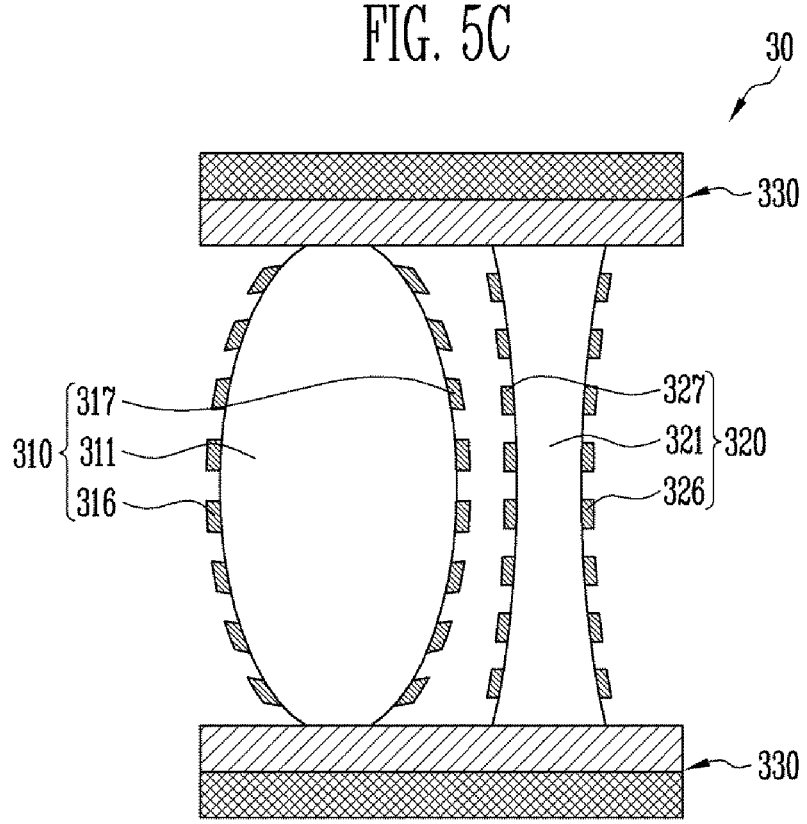
FIG. 5C is a sectional view illustrating a state in which the active lens in the embodiment of FIG. 4A is changed to one convex lens and one concave lens.

FIGS. 5A to 5C are sectional views illustrating a driving principle of the active lens according to the embodiment of the present disclosure, which show operation state views illustrating states in which the focus of the active lens 30 is controlled by the controller 12.

The principle that the shape of each of the first and second lenses 310 and 320 is changed to that of the convex lens or concave lens is the same as that described with reference to FIGS. 3A and 3B. In addition, the controller 12 may independently deform the first and second lenses 310 and 320, thereby implementing multiple focuses. Particularly, when a double lens having a variable focus is provided, an auto focusing refracting telescope or auto focusing microscope may be implemented.

Referring to FIGS. 5A and 5B, the controller 12 may independently apply a voltage to the first transparent electrodes 316 and 317 and the second transparent electrodes 326 and 327 such that the shape of both the first and second lenses 310 and 320 is changed to that of a convex lens. In this case, the voltage applied to the first lens 310 and the voltage applied to the second lens 320 may be independently controlled, thereby implementing various convex lenses having different focal distances. FIG. 5A shows a case where the shape of the first and second lenses 310 and 320 is changed to that of a convex lens having a short focal distance. FIG. 5B shows a case where the shape of the first lens 310 is changed to that of a convex lens having a short focal distance and the shape of the second lens 320 is changed to that of a convex lens having a long focal distance.

Referring to FIG. 5C, the controller may independently apply a voltage to the first transparent electrodes 316 and 317 and the second transparent electrodes 326 and 327 such that the first and second lenses 310 and are changed into different types. FIG. 5C shows a case where the shape of the first lens 310 is changed to that of a convex lens and the shape of the second lens 320 is changed to that of a concave lens.

Here, one of the first and second lenses 310 and 320 described with reference to FIGS. 5A to 5C may be an eye lens, and the other of the first and second lenses 310 and 320 may be an object lens. The active lens 30 may be applied to microscopes or telescopes. As an example, the auto focusing device having the active lens 30 of FIGS. 5A and 5B may be a microscope in which both an object lens and an eye lens are convex lenses. Here, the magnification of the microscope is determined by multiplying the magnification of the object lens and the magnification of the eye lens. As another example, the auto focusing device having the active lens 30 of FIGS. 5A and 5B may be a Galilean telescope in which both an object lens and an eye lens are convex lenses among refracting telescopes. As still another example, the auto focusing device having the active lens 30 of FIG. 5C may be a Keplerian telescope in which an object lens and an eye lens are convex and concave lenses, respectively.

According to the above-described principle, the focuses of the plurality of lenses 310 and 320 included in the active lens 30 are independently controlled by the controller 12, so that it is possible to implement various auto focusing devices such as microscopes and telescopes.

Figure 6:
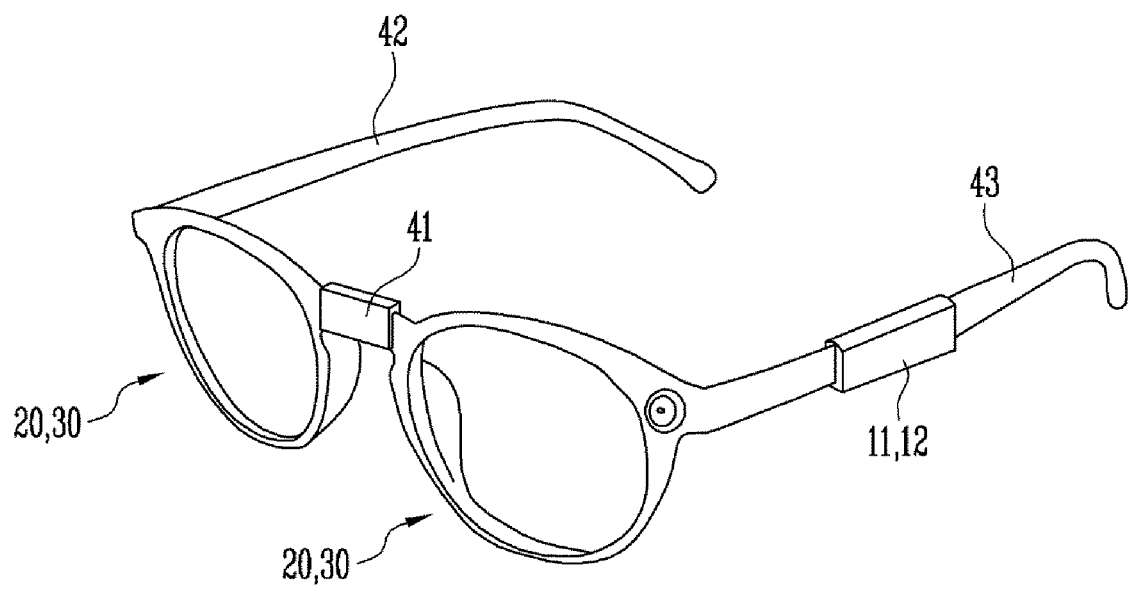
FIG. 6 is a perspective view illustrating glasses to which the embodiment of FIG. 1 or 4A is applied.

FIG. 6 is a perspective view illustrating a structure of glasses to which an active lens is applied according to an embodiment of the present disclosure. Referring to FIG. 6, the embodiment described in FIG. 1 or 4A may be applied to the glasses.

As an example, when the embodiment of FIG. 1 is applied to the glasses, multi-focus glasses may be implemented, which can correspond to both long-sightedness and short-sightedness. For example, the active lens 20 may include a glasses lens, a glasses frame, etc., and the controller 11 may be embedded in any one part 42 or 43 of the glasses, such as a glasses leg.

The controller 11 includes a memory to which a predetermined program is input, and may change the focus of the active lens 20 according to several focus modes suitable for user's eyes. For example, the controller may control the focus of the active lens 20, based on a first focus mode suitable for a case where the user intends to read a book and a second focus mode suitable for a case where the user intends to see a long distance. The user selects one of the first and second focus modes when necessary, so that it is possible to change the focus of the lens.

The configuration in which the user sets one of the first and second focus modes may be variously implemented. For example, a mode selection button may be installed at any one part 42 or 43 of the glasses, such as a glasses leg. Alternatively, if one mode is selected through an application installed in a separate device such as a cellular phone, the controller 11 may be connected to the device having the application installed therein through wireless communication, etc., to receive the selected mode.

As another example, when the embodiment of FIG. 4A is applied to the glasses, a glasses-type telescope or glasses-type microscope may be implemented. In this case, the active lens 30 may include a glasses lens of FIG. 6, a glasses frame, etc., and the controller 12 may be embedded in any one part 42 or 43 of the glasses, such as a glasses leg.

The controller 12 includes a memory to which a predetermined program is input, and may change the focus of the active lens 30 according to telescope and microscope modes. For example, the controller may control the focus of the active lens 30, based on a first focus mode suitable to be used as a telescope and a second focus mode suitable to be used as a microscope. When the active lens 30 is to be used as the telescope, the first focus mode may be set such that the shapes of the first and second lenses are changed as shown in FIG. 5B or 5C. When the active lens 30 is to be used as the microscope, the second focus mode may be set such that the shapes of the first and second lenses are changed as shown in FIG. 5A.

As still another example, the glasses to which the embodiment of FIG. 1 or 4A may further include a sensor 41. The sensor 41 is used to measure an inclination of the active lens 20 or 30 or a distance between an object and the active lens 20 or 30, i.e., an object distance. The sensor 41 may be an inclination sensor or distance sensor. The sensor 41 is equipped in a glasses frame, and may be located between a pair of active lenses 20 or 30.

The controller 11 or 12 is used to control the focal distance of the active lens 20 or 30 depending on a sensing value of the sensor 41. For example, the controller 11 or 12 is equipped in a glasses leg, and is electrically connected to the active lens 20 or 30 to control the focal distance of the active lens 20 or 30. A pair of controllers 11 or 12 may be equipped in both legs of the glasses frame to control the pair of active lenses 20 or 30, respectively.

In general, people bend their faces when viewing an object at a short distance and look at the front when viewing an object at a long distance. Thus, if an angle at which a glasses wearer bends its face, i.e., an inclination of a glasses frame is measured, it is possible to calculate a distance between the wearer and an object viewed by the wearer. By using such a principle, the controller 11 or 12 changes the shape and focal distance of the active lens 20 or 300 through a feedback corresponding to the inclination.

The controller 11 or 12 may include a database that stores basic data for calculating an appropriate focal distance from a sensing value of the sensor 41. For example, the basic data may include an equation or mapping table representing a correlation among an inclination, an object distance, and a focal distance, or may include information on a user's binocular vision.

The operating principle when the sensor 41 is an inclination sensor and the active lens 20 or 30 includes an electroactive polymer lens having the shape of a concave lens will be described as follows. If the inclination of the active lens 20 or 30, measured by the sensor 41, is 0 to 10 degrees, the controller 11 or 12 determines that the wearer sees an object at a long distance, and applies no voltage to the transparent electrodes. Here, the long distance may be 3 m or longer. In this case, the active lens 20 or 30 maintains the original shape, i.e., the shape of a concave lens having a relatively short focal distance. If the inclination of the active lens 20 or 30, measured by the sensor 41, is 10 to 30 degrees, the controller 11 or 12 determines that the wearer sees an object at a middle distance, and applies a first voltage to the transparent electrodes. Here, the middle distance may be 0.5 to 3 m. In addition, the first voltage has a relatively small value, and may be 1 to 4 kV. In this case, the shape of the active lens 20 or 30 is changed to that of a concave lens having a relatively long focal distance. If the inclination of the active lens 20 or 30, measured by the sensor 41, is 30 degrees or more, the controller 11 or 12 determines that the wearer sees an object at a short distance, and applies a second voltage to the transparent electrodes. Here, the short distance may be 0.5 m or shorter. In addition, the second voltage has a larger value than the first voltage, and may be 4 to 10 kV. In this case, as the focal distance of the active lens 20 or 30 becomes shorter, the shape of the active lens 20 or 30 is changed to that of a convex lens having a shorter distance.

The operating principle when the sensor 41 is an inclination sensor and the active lens 20 or 30 includes an electroactive polymer lens having the shape of a convex lens will be described as follows. If the inclination of the active lens 20 or 30, measured by the sensor 41, is 30 degrees or more, the controller 11 or 12 determines that the wearer sees an object at a short distance, and applies no voltage to the transparent electrodes. Here, the short distance may be 0.5 m or shorter. In this case, the active lens 20 or 30 maintains the original shape, i.e., the shape of a convex lens having a short focal distance. If the inclination of the active lens 20 or 30, measured by the sensor 41, is 10 to 30 degrees, the controller 11 or 12 determines that the wearer sees an object at a middle distance, and applies a first voltage to the transparent electrodes. Here, the middle distance may be 0.5 to 3 m. In addition, the first voltage has a relatively small value, and may be 1 to 4 kV. In this case, the shape of the active lens 20 or 30 is changed to that of a concave lens having a relatively long focal distance. If the inclination of the active lens 20 or 30, measured by the sensor 41, is 0 to 10 degrees, the controller 11 or 12 determines that the wearer sees an object at a long distance, and applies a second voltage to the transparent electrodes. Here, the long distance may be 3 m or longer. In addition, the second voltage has a larger value than the first voltage, and may be 4 to 10 kV. In this case, the shape of the active lens 20 or 30 is changed to that of a concave lens having a relatively short focal distance.

For reference, when the sensor 41 is a distance sensor, the focal distance of the active lens 20 or 30 may be controlled using a measured distance. When the distance sensor is used, a distance between an object and the wearer can be sensed using a sensing value, without calculating the distance between the object and the wearer through an inclination.

Figure 7:
FIG. 7 is a block diagram illustrating still another embodiment of the present disclosure.

FIG. 7 is a block diagram illustrating an auto focusing device according to still another embodiment of the present disclosure.

Referring to FIG. 7, the auto focusing device according to the embodiment of the present disclosure includes an active lens 50 and a controller 13 for controlling the focus of the active lens 50. The shape of the active lens 50 is changed depending on a voltage applied by the controller 13, and the focus of the active lens 50 may be changed depending on the changed shape.

Figure 8A:
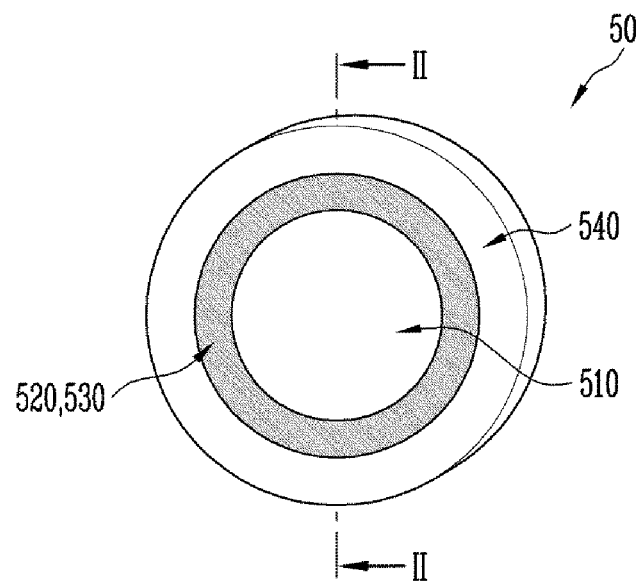
FIG. 8A is a perspective view illustrating an active lens in the embodiment of FIG. 7.
Figure 8B:
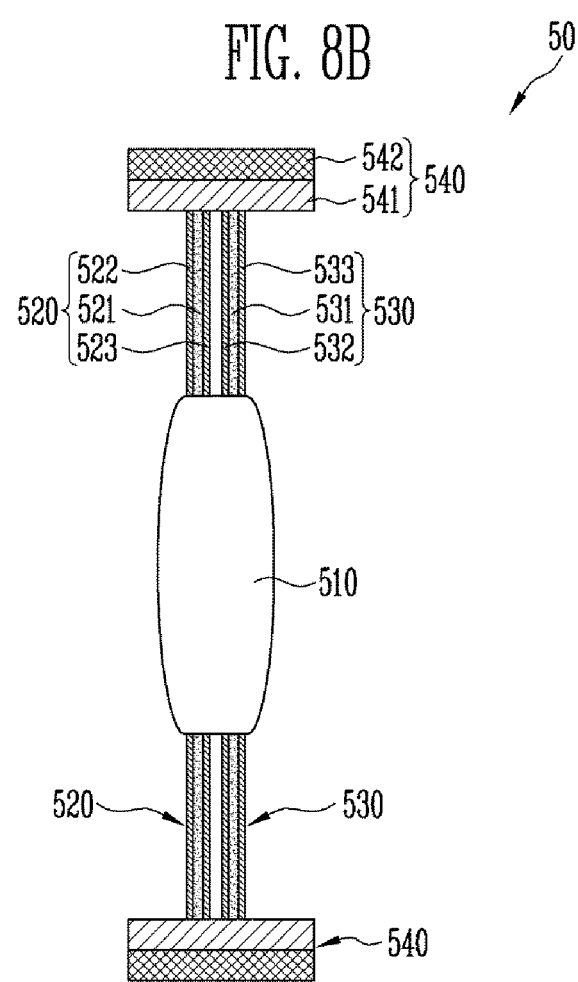
FIG. 8B is a sectional view taken along line II-II of FIG. 8A.

FIG. 8A is a perspective view illustrating the active lens in the embodiment of FIG. 7, and FIG. 8B is a sectional view taken along line II-II of FIG. 8A.

Referring to FIGS. 8A and 8B, the active lens 50 includes a lens 510 and a lens frame 520, 530, and 540 for fixing and supporting the lens 510. The controller 13 controls the focus of the active lens 50 by changing the shape of the lens frame 520, 530, and 540.

The lens 510 is a transparent lens having a circular shape. However, the shape of the edge of the lens is not limited to the circular shape. In these figures, it is illustrated that the lens 510 is a convex lens. However, the present disclosure is not limited thereto, and various types of lenses such as a concave lens may be applied. For example, the lens 510 may be a lens available for glasses, microscopes, telescopes, cameras, etc.

The lens frame 520, 530, and 540 surrounds and fixes the edge of the lens 510 and supports the lens 510. Also, the lens frame 520, 530, and 540 moves the position of the lens 510 as the shape of the lens frame 520, 530, and 540 is changed. The lens frame 520, 530, and 540 includes a support frame 540 forming the external appearance thereof and a variable frame 520 and 530 moving the position of the lens 510 with respect to the support frame 540.

The support frame 540 includes a ring-shaped frame body 542 forming the external appearance thereof and an insulating frame 541 provided between the frame body 542 and the variable frame 520 and 530. The insulating frame 541 is an insulator surrounding the edge of the variable frame 520 and 530. The variable frame 520 and 530 is insulated from surroundings by the insulating frame 541. The insulating frame 541 may be made of a flexible insulating material.

The support frame 540 is entirely formed in the shape of a circular ring. However, the present disclosure is not limited thereto, and the support frame 540 may be formed in any shape capable of supporting the lens moved by the variable frame.

As the length of the variable frame 520 and 530 is increased when a voltage is applied, the variable frame 520 and 530 may move the position of the lens 510. The variable frame 520 and 530 is a member that surrounds the edge of the lens 510 and flexibly fixes the lens 510 to the support frame 540. If left and right sides of FIG. 8B are referred to as the front and rear, respectively, the variable frame 520 and 530 includes a front variable frame 520 disposed at the front and a rear variable frame 530 disposed at the rear.

The front variable frame 520 includes a front variable body 521 and transparent electrodes 522 and 523 coated on surfaces of the front variable body 521. The front variable body 521 is a film-shaped member having a predetermined thickness. The front variable body 521 is made of a flexible material. For example, the front variable body 521 includes electroactive polymer. The electroactive polymer includes PDMS.

The transparent electrodes 522 and 523 are coated on rear and front surfaces of the front variable body 521, respectively. The transparent electrodes 522 and 523 of the front variable frame 520 are entirely coated as transparent electrodes on the front and rear surfaces of the front variable body 521, respectively. However, the present disclosure is not limited thereto, and, like the transparent electrodes 216 and 217 of FIG. 2B, the transparent electrodes 522 and 523 of the front variable frame 520 may be provided in plurality to be partially coated on the front and rear surfaces of the front variable body 521, respectively. When a plurality of transparent electrodes are partially coated as described above, voltages having different intensities may be applied to respective portions such that degrees of deformation of the portions are different from each other.

The rear variable frame 530 includes a rear variable body 531 and transparent electrodes 532 and 533 coated on surfaces of the rear variable body 531. The rear variable body 531 is a film-shaped member having the same shape as the front variable body 521. The rear variable body 531 is made of a flexible material, and includes, for example, electroactive polymer. The electroactive polymer may include PDMS.

The transparent electrodes 532 and 533 are coated on rear and front surfaces of the rear variable body 531, respectively. The transparent electrodes 532 and 533 of the rear variable frame 530 are entirely coated as transparent electrodes on the front and rear surfaces of the rear variable body 531, respectively. However, the present disclosure is not limited thereto, and, like the transparent electrodes 216 and 217 of FIG. 2B, the transparent electrodes 532 and 533 of the rear variable frame 530 may be provided in plurality to be partially coated on the front and rear surfaces of the rear variable body 531, respectively.

The transparent electrodes 522 and 523 of the front variable frame 520 and the transparent electrodes 532 and 533 of the rear variable frame 530 are made of a transparent conductive material. For example, the transparent electrodes 532 and 533 may include at least one of silver nano-wire, graphene, and indium tin oxide. The material of the transparent electrodes 532 and 533 may be any transparent and flexible conductive material.

The variable frame 320 and 330 is entirely formed in the shape of a ring-shaped film surrounding the edge of the lens 510, but the present disclosure is not limited thereto.

One of the front and rear variable frames 520 and 530 is deformed by the controller 13, thereby moving the lens 510 forward or backward.

Figure 9A:
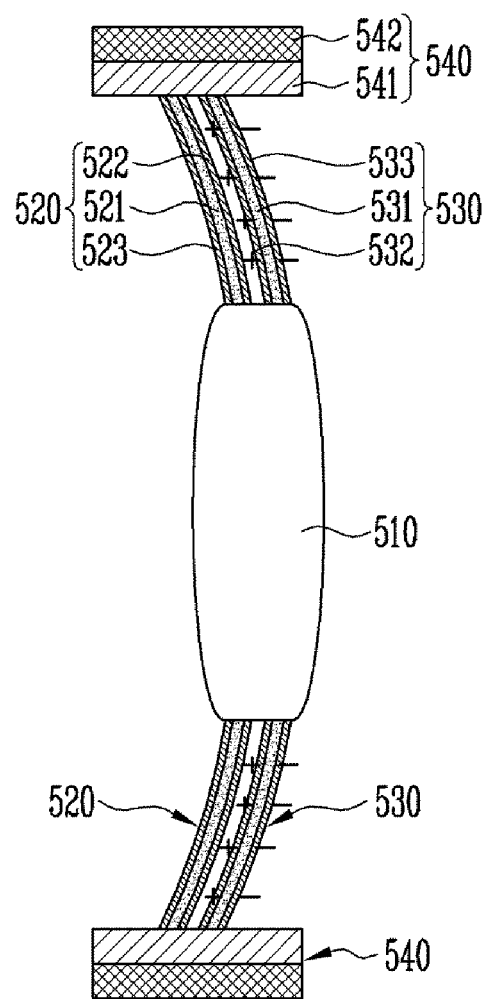
FIG. 9A is a sectional view illustrating a state in which the active lens of FIG. 8B is moved backward.
Figure 9B:
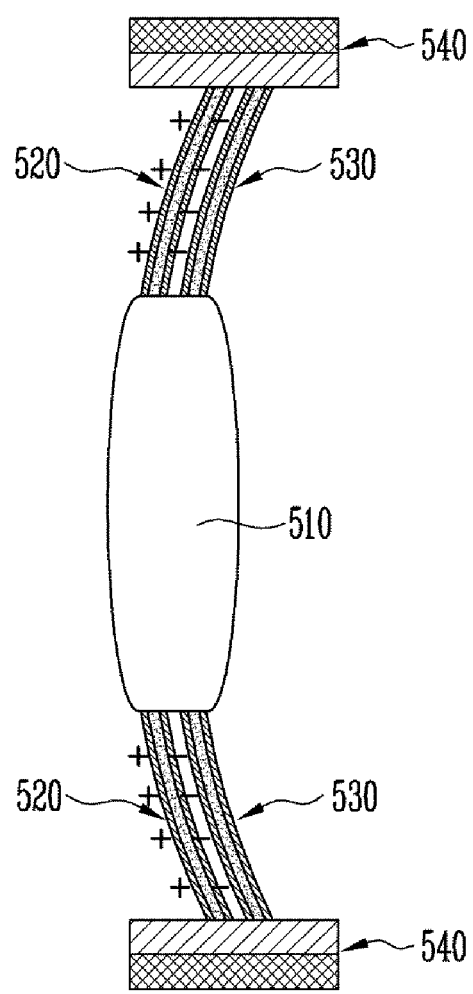
FIG. 9B is a sectional view illustrating a state in which the active lens of FIG. 8B is moved forward.

FIGS. 9A and 9B are sectional views illustrating a driving principle of the active lens according to the embodiment of the present disclosure, which show operation state views illustrating states in which the focus of the active lens 50 is controlled by the controller 13.

Referring to FIG. 9A, a voltage is applied to the transparent electrodes 532 and 533 of the rear variable frame 530 by the controller 13, and no voltage is applied to the transparent electrodes 522 and 523 of the front variable frame 520. Then, since the rear variable body 531 is made of the electroactive polymer, its length is increased. On the other hand, since no voltage is applied to the front variable frame 520, its length is not changed. Therefore, as only the length of the rear variable frame 530 is increased, the variable frame 520 and 530 is entirely curved backward, and the lens 510 fixed to the variable frame 520 and 530 is also moved backward.

Referring to FIG. 9B, a voltage is applied to the transparent electrodes 522 and 523 of the front variable frame 520 by the controller 13, and no voltage is not applied to the transparent electrodes 532 and 533 of the rear variable frame 530. Then, since the front variable body 521 is made of the electroactive polymer, its length is increased. On the other hand, since no voltage is applied to the rear variable frame 530, its length is not changed. Therefore, as only the length of the front variable frame 520 is increased, the variable frame 520 and 530 is entirely curved forward, and the lens 510 fixed to the variable frame 520 and 530 is also moved forward.

In this manner, the controller 13 selectively applies a voltage to the front variable frame 520 or the rear variable frame 530, thereby changing the position of the lens 510. Thus, the focus of the active lens 50 can be controlled.

Figure 10:
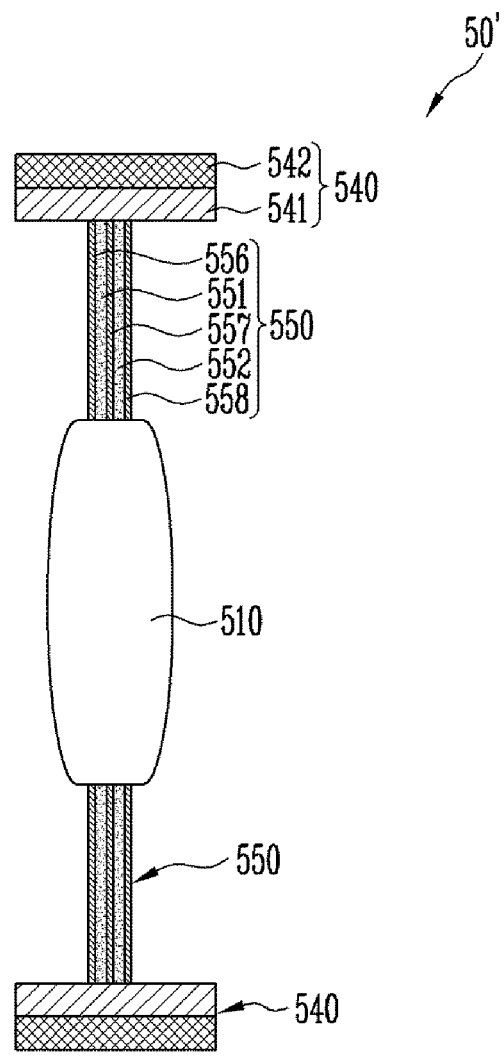
FIG. 10 is a sectional view illustrating a modification of the active lens of FIG. 8B.

FIG. 10 is a sectional view illustrating a modification of the active lens included in the auto focusing device according to the embodiment of the present disclosure. The active lens 50' according to the modification of the present disclosure has a similar structure to the active lens 50 described with reference to FIG. 8B, but the structure of variable frame is modified.

Referring to FIG. 10, the active lens 50' includes a lens 510 and a lens frame 540 and 550 that fixes and supports the lens 510. The lens frame 540 and 550 includes a variable frame 550 and a support frame 540. Detailed configurations of the lens 510 and the support frame 540 are the same as those described with reference to FIGS. 8A and 8B.

The variable frame 550 is a member that surrounds the edge of the lens 510 and flexibly fixes the lens 510 to the support frame 540. The variable frame 550 includes a front variable body 551, a rear variable body 552, a front transparent electrode 556, an intermediate transparent electrode 557, and a rear transparent electrode 558. Each of the front and rear variable bodies 551 and 552 includes electroactive polymer.

The intermediate transparent electrode 557 is provided between the front and rear variable bodies 551 and 552. In other words, the front and rear variable bodies 551 and 552 are connected to each other by the intermediate transparent electrode 557. The front transparent electrode 556 is coated on a front surface of the front variable body 551, and the rear transparent electrode 558 is coated on a rear surface of the rear variable body 552.

The front transparent electrode 556 is entirely provided as one transparent electrode on the front surface of the front variable body 551. However, the present disclosure is not limited thereto, and, like the transparent electrodes 216 and 217 of FIG. 2B, the front transparent electrode 556 may be partially provided. Like the front transparent electrode 556, each of the intermediate transparent electrode 557 and the rear transparent electrode 558 is entirely provided as one transparent electrode. However, the present disclosure is not limited thereto, and a plurality of intermediate transparent electrodes or rear transparent electrodes may be partially disposed to be spaced apart from each other.

The principle that the focus of the active lens 50' of FIG. 10 is controlled is the same as that described with reference to FIGS. 9A and 9B. Voltages may be independently applied respectively to the front transparent electrode 556, the intermediate transparent electrode 557, and the rear transparent electrode 558 by the controller 13. When the lens 510 is to be moved as shown in FIG. 9A, voltages may be respectively applied to the intermediate transparent electrode 557 and the rear transparent electrode 558 by the controller 13. When the lens 510 is to be moved as shown in FIG. 9B, voltages may be respectively applied to the front transparent electrode 556 and the intermediate transparent electrode 557 by the controller 13.

Figure 11A:
FIG. 11A is a block diagram illustrating still another embodiment of the present disclosure.
Figure 11B:
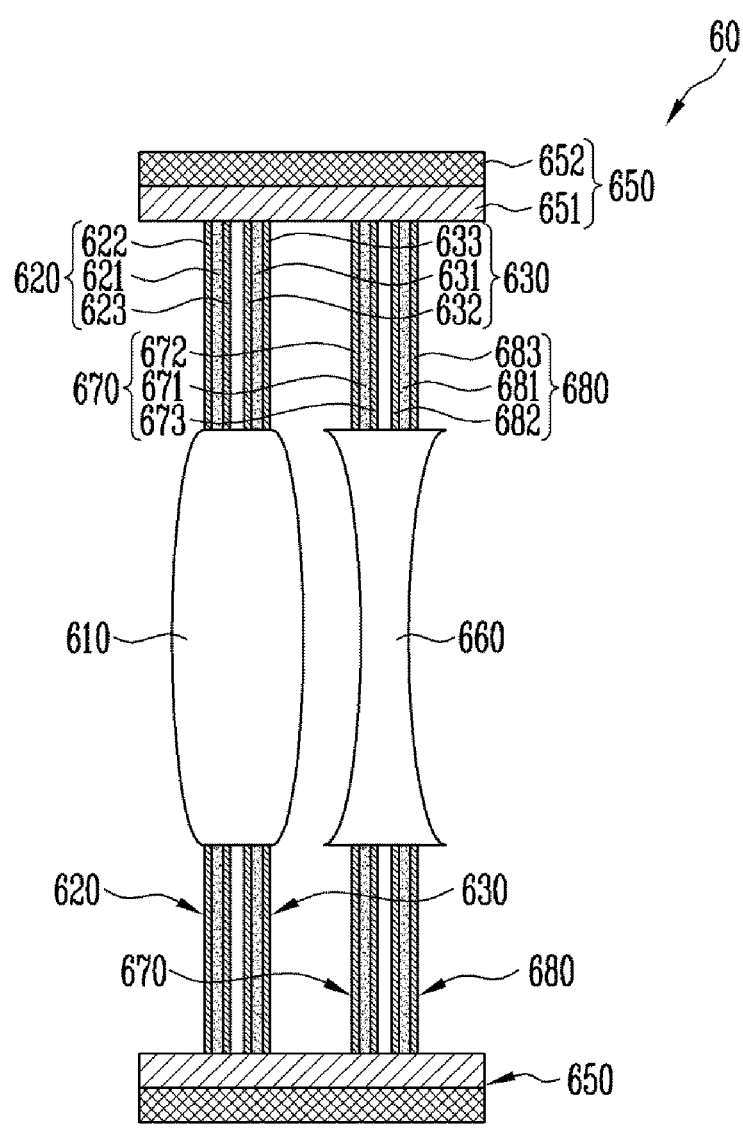
FIG. 11B is a sectional view illustrating an active lens of FIG. 11A.

FIG. 11A is a block diagram illustrating still another embodiment of the present disclosure, and FIG. 11B is a sectional view illustrating an active lens. In the above-described embodiment, it has been illustrated that the active lens 50 includes one lens. In this embodiment, it is illustrated that the active lens 60 includes a plurality of lenses. Also, in these figures, it is illustrated that the active lens 60 has the configuration of the variable frame in the embodiment of FIG. 7. However, the present disclosure is not limited thereto, and the variable frame in the embodiment of FIG. 10 may be applied to the embodiment of FIG. 11A.

Referring to FIGS. 11A and 11B, the auto focusing device according to the embodiment of the present invention includes the active lens 60 and a controller 14 for controlling the focus of the active lens 60. The active lens 60 includes a first lens 610, a second lens 660, and a lens frame 620, 630, 650, 670, and 680 that simultaneously fixes and supports the first and second lenses 610 and 660. The positions of the first and second lenses 610 and 660 are independently changed by the controller 14, thereby controlling the focus of the active lens 60.

The first lens 610 is a transparent convex lens and the second lens 660 is a transparent concave lens. The first and second lenses 610 and 660 are arranged to have the same optical axis. The optical axis is parallel to the front-rear direction when left and right sides of FIG. 11B are referred to as the front and rear, respectively.

The lens frame 620, 630, 650, 670, and 680 simultaneously fixes and supports the first and second lenses 610 and 660 by surrounding the edges of the first and second lenses 610 and 660. Also, the lens frame 620, 630, 650, 670, and 680 moves the position of the first lens 610 and the position of the second lens 660 as its shape is changed by the controller 14. The lens frame 620, 630, 650, 670, and 680 includes a support frame 650 forming the external appearance thereof, a first variable frame 620 and 630 moving the position of the first lens 610 with respect to the support frame 650, and a second variable frame 670 and 680 moving the position of the second lens 660 with respect to the support frame 650.

The support frame 650 includes a ring-shaped frame body 652 forming the external appearance thereof and an insulating frame 651 provided between the frame body 652 and the first and second variable frames 620, 630, 670, and 680. The frame body 652 may be formed in the shape of a cylinder extending in the front-rear direction with a length where the first and second lenses 610 and 660 can be disposed to be spaced apart from each other. The insulating frame 651 insulates between the support frame 650 and the first and second variable frames 620, 630, 670, and 680 by surrounding the edges of the first and second variable frames 620, 630, 670 and 680. The insulating frame 651 may be made of a flexible insulating material.

As the length of the first variable frame 620 and 630 is increased when a voltage is applied, the first variable frame 620 and 630 may move the position of the first lens 610 along the optical axis. The first variable frame 620 and 630 is a member that surrounds the edge of the first lens 610 and flexibly fixes the first lens 610 to the support frame 650. The first variable frame 620 and 630 includes a first front variable frame 620 disposed at the front and a first rear variable frame 630 disposed at the rear.

The first front variable frame 620 includes a first front variable body 621 and transparent electrodes 622 and 623 coated on surfaces of the first front variable body 621. The first front variable frame 620 has the substantially same configuration as the front variable frame 520 described with reference to FIGS. 8A and 8B, and therefore, its detailed description will be omitted. The first rear variable frame 630 includes a first rear variable body 631 and transparent electrodes 632 and 633 coated on surfaces of the first rear variable body 631. The first rear variable frame 630 has the substantially same configuration as the rear variable frame 530 described with reference to FIGS. 8A and 8B, and therefore, its detailed description will be omitted.

As the length of the second variable frame 670 and 680 is increased when a voltage is applied, the second variable frame 670 and 680 may move the position of the second lens 660 along the optical axis. The second variable frame 670 and 680 is a member that surrounds the edge of the second lens 660 and flexibly fixes the second lens 660 to the support frame 650. The second variable frame 670 and 680 includes a second front variable frame 670 disposed at the front and a second rear variable frame 680 disposed at the rear.

The second front variable frame 670 includes a second front variable body 671 and transparent electrodes 672 and 673 coated on surfaces of the second front variable body 671. The second front variable frame 670 has the substantially same configuration as the front variable frame 520 described with reference to FIGS. 8A and 8B. The second rear variable frame 680 includes a second rear variable body 681 and transparent electrodes 682 and 683 coated on surfaces of the second rear variable body 681. The second rear variable frame 680 has the substantially same configuration as the rear variable frame 530 described with reference to FIGS. 8A and 8B, and therefore, its detailed description will be omitted.

The first and second lenses 610 and 660 are spaced apart from each other along the optical axis, and the first variable frame 620 and 630 fixing the first lens 610 and the second variable frame 670 and 680 fixing the second lens 660 have portions connected to the insulating frame 651, which are spaced apart from each other.

In this embodiment, it is illustrated that the first lens 610 is a convex lens and the second lens 660 is a concave lens, but the present disclosure is not limited thereto. Both the first and second lenses 610 and 660 may be convex or concave lenses, or the first and second lenses 610 and 660 may be concave and convex lenses, respectively. Alternatively, at least one of the first and second lenses 610 and 660 may be a planar lens or a lens having one spherical surface. When necessary, various types of lenses may be provided as the first and second lenses 610 and 660.

FIGS. 12A to 12D are sectional views illustrating a driving principle of the active lens according to the embodiment of the present disclosure, which show operation state views illustrating states in which the focus of the active lens 60 is controlled by the controller 14.

Here, the principle that the first and second lenses 610 and 660 are moved in the front-rear direction as voltages are respectively applied to the first variable frame 620 and 630 and the second variable frame 670 and 680 is the same as that described with reference to FIGS. 9A and 9B. Hereinafter, the principle that the focus of the active lens 60 is controlled as the positions of the first and second lenses 610 and 660 are changed by the controller 14 will be described in detail.

Referring to FIG. 12A, as voltages are respectively applied to the first rear variable frame 630 and the second rear variable frame 680 by the controller 14, both the first and second lenses 610 and 660 are moved backward. When assuming that an object at the front is viewed through the active lens 60 at the rear, FIG. 12A shows a case where the focus of the active lens 60 is controlled as the distance between an eye and the active lens 60 is decreased by the controller 14.

Figure 12B:
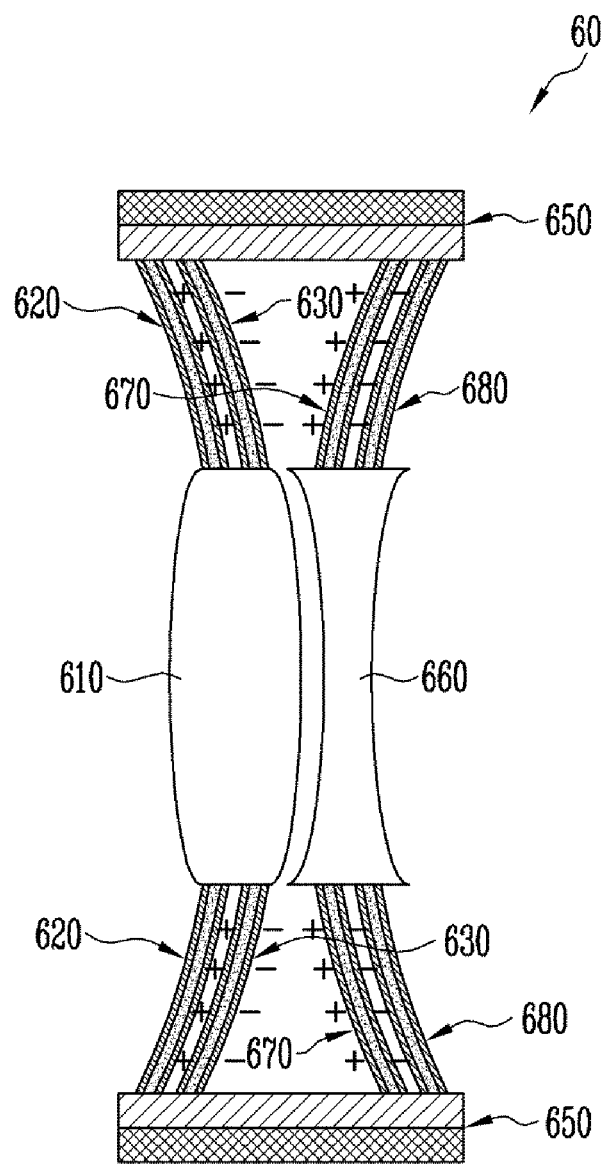
FIG. 12B is a sectional view illustrating a state in which the distance between first and second lenses of the active lens of FIG. 11B is narrowed.

Referring to FIG. 12B, as voltages are respectively applied to the first rear variable frame 630 and the second front variable frame 670 by the controller 14, the first lens 610 is moved backward and the second lens 660 is moved forward. FIG. 12B shows a case where the focus of the active lens 60 is controlled as the distance between the first and second lenses 610 and 660 is decreased by the controller 14.

Figure 12C:
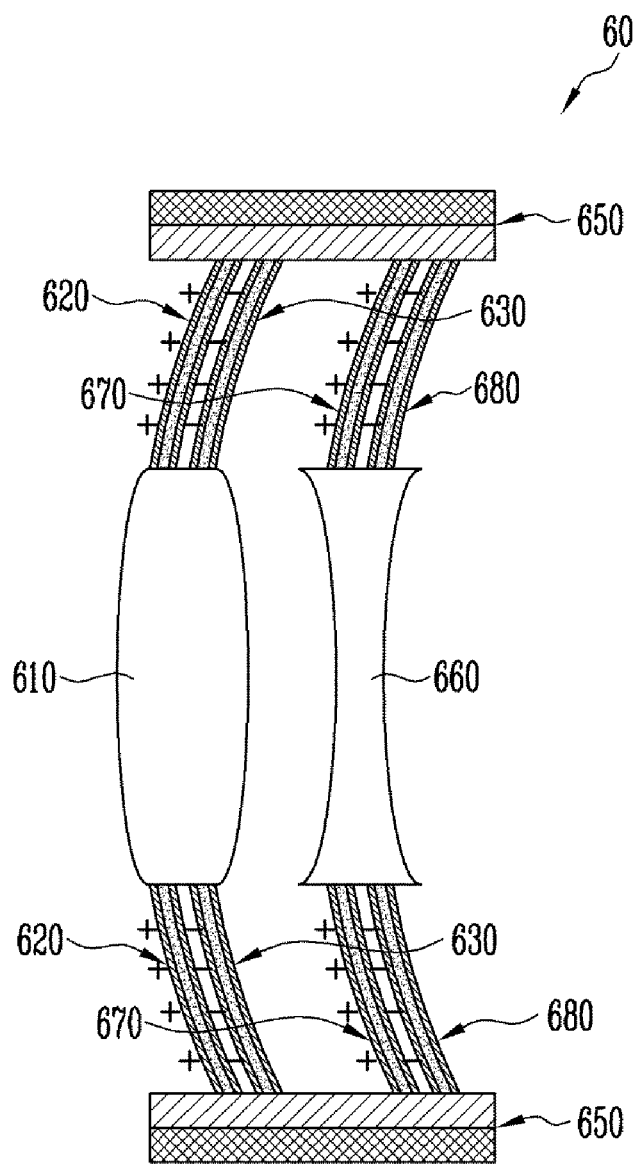
FIG. 12C is a sectional view illustrating a state in which the active lens of FIG. 11B is moved forward.

Referring to FIG. 12C, as voltages are respectively applied to the first front variable frame 620 and the second front variable frame 670 by the controller 14, both the first and second lenses 610 and 660 are moved forward. FIG. 12C shows a case where the focus of the active lens 60 is controlled as the distance between the eye and the active lens 60 is increased by the controller 14.

Figure 12D:
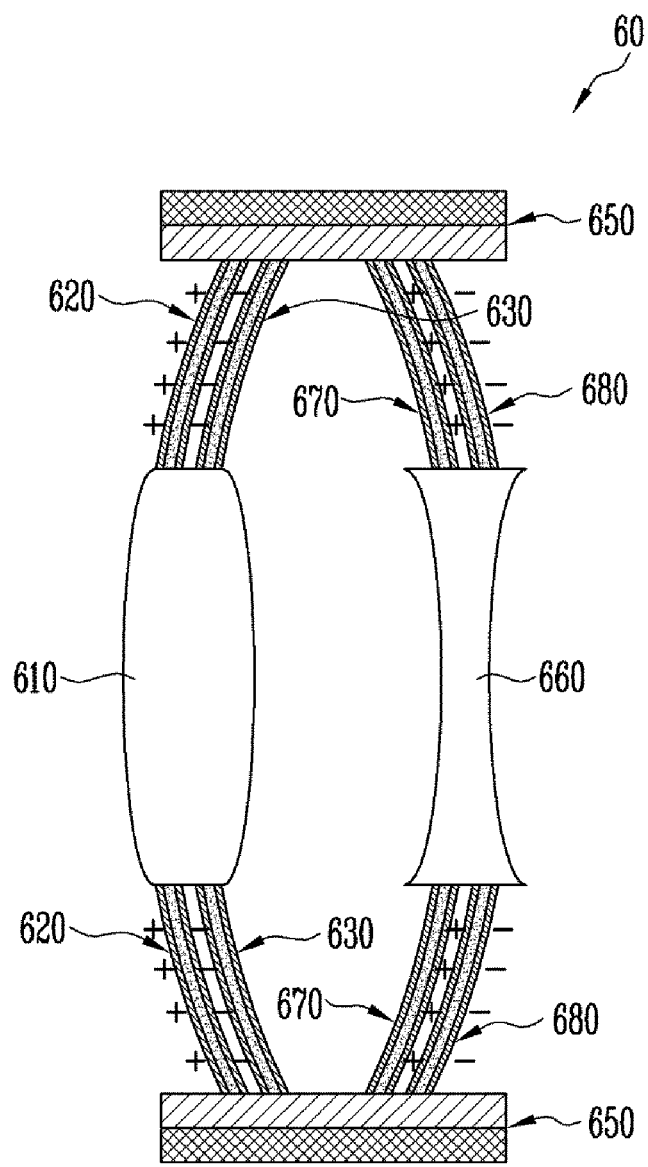
FIG. 12D is a sectional view illustrating a state in which the distance between the first and second lenses of the active lens of FIG. 11B is widened.

Referring to FIG. 12D, as voltages are respectively applied to the first front variable frame 620 and the second rear variable frame 680 by the controller 14, the first lens 610 is moved forward and the second lens 660 is moved backward. FIG. 12D shows a case where the focus of the active lens 60 is controlled as the distance between the first and second lenses 610 and 660 is increased by the controller 14.

According to the above-described principle, the distance between the plurality of lenses, the distance between an eye and the lens, and the distance between an object and the lens are changed by moving the positions of a plurality of lenses through a variable frame, thereby controlling the focus of the active lens. In addition, since the first and second lenses 610 and 660 are respectively convex and concave lenses in the active lens 60 of FIG. 11, the active lens 60 may be applied to a Keplerian telescope. As another embodiment, when both the first and second lenses 610 and 660 are convex lenses, the active lens 60 may be applied to a Galilean refracting telescope or microscope.

Figure 13:
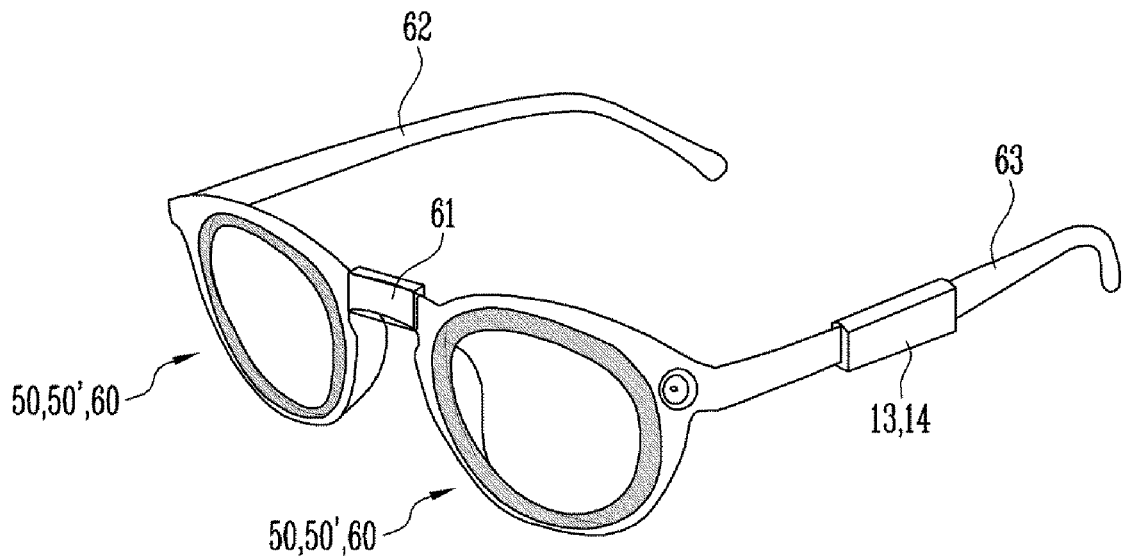
FIG. 13 is a perspective view illustrating glasses to which the embodiment of FIG. 7 or 11A is applied.

FIG. 13 is a perspective view illustrating a structure of glasses to which the active lens according to the embodiment of FIGS. 7 and 10 or the embodiment of FIG. 11A is applied.

As an example, when the embodiment of FIGS. 7 and 10 is implemented as the glasses of FIG. 13, the active lens 50 or 50' may include a glasses lens, a glasses frame, etc., and the controller 13 may be embedded in any one part 61, 62, or 63 of the glasses, such as a glasses leg. The controller 13 includes a memory to which a predetermined program is input, and may change the position of the active lens 50 or 50', based on a plurality of modes set such that the distance between a user's eye and the active lens 50 or 50' can be gradually adjusted. In addition, a detailed configuration implemented as the glasses is the same as that described with reference to FIG. 6, and therefore, its detailed description will be omitted.

As another example, when the embodiment of FIG. 11A is implemented as the glasses of FIG. 13, the active lens 60 may include a glasses lens, a glasses frame, etc., and the controller 14 may be embedded in any one part 61, 62, or 63 of the glasses, such as a glasses leg. The controller 14 includes a memory to which a predetermined program is input, and may control the focus of the active lens, based on a plurality of modes suitable for a glasses-type telescope or glasses-type microscope according to shapes of the first and second lenses. The plurality of modes may be determined using various combinations in which a desired focus can be obtained by respectively changing the distance between the first and second lenses 610 and 660, the distance between the active lens and an eye, and the distance between the active lens and an object.

As still another example, the glasses to which the embodiment of FIG. 10 or 11A may further include a sensor 61. The sensor 61 is used to measure an inclination of the active lens 50, 50', or 60 or a distance between an object and the active lens 50, 50', or 60. The sensor 61 may be an inclination sensor or distance sensor. The sensor 61 is equipped in a glasses frame, and may be located between a pair of active lenses 50, 50', or 60.

The controller 13 or 14 is used to control the focal distance of the active lens 50, 50', or 60 depending on a sensing value of the sensor 61, and may be equipped in the glasses frame. For example, the controller 13 or 14 is equipped in a glasses leg, and is electrically connected to a variable frame to change the shape of the variable frame, thereby controlling the focal distance of the active lens 50, 50', or 60. A pair of controllers 13 or 14 may be equipped in both glasses legs to control a pair of variable frames, respectively.

In general, people bend their faces when viewing an object at a short distance and look at the front when viewing an object at a long distance. Thus, if an angle at which a glasses wearer bends its face, i.e., an inclination of a glasses frame is measured, it is possible to calculate a distance between the wearer and an object viewed by the wearer. By using such a principle, the controller 13 or 14 changes the shape of the variable frame through a feedback corresponding to the inclination, and accordingly, the focus of the lens is changed by moving the lens.

The operating principle when the sensor 61 is an inclination sensor and the active lens 50, 50', or 60 includes a general lens having the shape of a concave lens will be described as follows. If the inclination of the active lens 50, 50', or 60, measured by the sensor 61, is 0 to 10 degrees, the controller 13 or 14 determines that the wearer sees an object at a long distance, and applies no voltage to the transparent electrodes. Here, the long distance may be 3 m or longer. In this case, the variable frame maintains the original shape, and the lens is also not moved. That is, the lens does not protrude as compared with the front of the glasses frame.

As another example, if the inclination of the active lens 50, 50', or 60, measured by the sensor 61, is 10 to 30 degrees, the controller 13 or 14 determines that the wearer sees an object at a middle distance, and applies a first voltage to the transparent electrodes. Here, the middle distance may be 0.5 to 3 m. In addition, the first voltage has a relatively small value, and may be 1 to 4 kV. In this case, the variable body is expanded to protrude to the front of the glasses frame. Thus, the lens connected to the variable frame protrudes by a first distance D1 to the front of the glasses frame. Accordingly, the focal distance of the lens is changed, and the position at which an image is formed on a retina is changed. If the inclination of the active lens 50, 50', or 60, measured by the sensor 61, is 30 degrees or more, the controller 13 or 14 determines that the wearer sees an object at a short distance, and applies a second voltage to the transparent electrodes. Here, the short distance may be 0.5 m or shorter. In addition, the second voltage has a larger value than the first voltage, and may be 4 to 10 kV. In this case, the variable body is relatively further expanded to further protrude to the front of the glasses frame. Thus, the lens connected to the variable frame protrudes by a second distance D2 to the front of the glasses frame. Here, the second distance D2 has a larger value than the first distance D1. Accordingly, the focal distance of the lens is changed, and the position at which an image is formed on the retina is changed.

For reference, when the sensor 61 may be a distance sensor. In this case, the distance between an object and the wearer may be directly calculated, without calculating the distance between the object and the wearer through an inclination.

Figure 14:
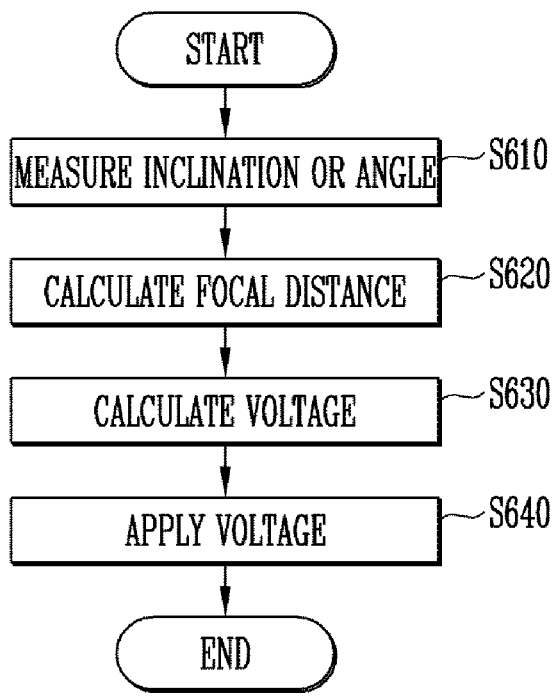
FIG. 14 is a flowchart illustrating a focus control method of glasses according to an embodiment of the present disclosure.

FIG. 14 is a flowchart illustrating a focus control method of active multi-focus glasses according to an embodiment of the present disclosure. A driving method of the glasses according to the embodiment described with reference to FIG. 6 or 13 will be described.

First, an inclination of the active lens 20, 30, 50, 50', or 60 or a distance between an object and the active lens 20, 30, 50, 50', or 60 is measured using the sensor 41 or 61 (S610). In this case, an inclination sensor or distance sensor may be used as the sensor 41 or 61.

Subsequently, the controller 11, 12, 13, or 14 calculates an appropriate focal distance of the active lens 20, 30, 50, 50', or 60 by using a measurement value of the sensor 41 or 61 (S620). When the inclination sensor is used, a distance between the active lens 20, 30, 50, 50', or 60 and an object is calculated using a measured angle, and therefore, an appropriate focal distance may be calculated. When the distance sensor is used, an appropriate distance may be calculated using a measured distance.

Subsequently, the controller 11, 12, 13, or 14 calculates a voltage to be applied to the transparent electrodes (S630). In this case, the controller 11, 12, 13, or 14 may calculate the voltage by considering a correlation between the inclination and the object distance, a wearer's binocular vision, a correlation between the voltage applied to the transparent electrodes and the intensity of an electric field, the degree of expansion of electroactive polymer corresponding to the voltage applied to the transparent electrodes, etc.

Subsequently, the controller 11, 12, 13, or 14 changes the focal distance of the active lens 20, 30, 50, 50', or 60 is changed by applying a voltage to the transparent electrodes (S640). Accordingly, the focus of the glasses can be changed without any wearer's manipulation.

According to the present disclosure, electroactive polymer that can be variously changed by an electric field is applied to the active lens, so that it is possible to achieve a change in focus, which has a fast response speed and is flexible.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An auto focusing device comprising:
   at least one lens including a front surface and a rear surface opposite the front surface;
   a support frame;
   a variable frame extending between the support frame and the at least one lens, the variable frame including a variable body supporting the at least one lens relative to the support frame, the variable body including electroactive polymer, and a transparent electrode coated on at least part of a surface of the variable body; and
   a controller controlling a focus of the lens by applying a voltage to the transparent electrode,
   wherein the variable frame includes a first variable frame and a second variable frame, the first variable frame arranged relative to the second variable frame to be closer than the second variable frame to a front side of the auto focusing device,
   wherein the transparent electrode includes a first transparent electrode coated on at least a part of a first variable body of the first variable frame and a second transparent electrode coated on at least part of a second variable body of the second variable frame,
   wherein the first variable body is separated from the second variable body,
   wherein the controller controls a position of the at least one lens in a thickness direction by selectively applying a voltage to the first transparent electrode and the second transparent electrode, and
   wherein controlling a position of the at least one lens includes changing a position of each of the front surface and the rear surface of the at least one lens.

2. The auto focusing device of claim 1, wherein a position of the at least one lens is changed as the voltage applied to the transparent electrode is controlled by the controller.

3. The auto focusing device of claim 1, wherein a position of the lens body in its thickness direction is changed as the length of the first variable frame or the second variable frame is changed by the controller.

4. The auto focusing device of claim 3, wherein the first transparent electrode is coated on a front surface of the first variable body, wherein the second transparent electrode is coated on a rear surface of the second variable body, and wherein transparent electrode includes:
a third transparent electrode coated on a rear surface of the first variable body; and
a fourth transparent electrode coated on a front surface of the second variable body, and
wherein the third transparent electrode is separated from the fourth variable electrode.

5. The auto focusing device of claim 1, wherein the first variable body includes electroactive polymer,
the second variable body includes electroactive polymer,
the first transparent electrode is a front transparent electrode coated on at least a part of a front surface of the first variable body,
the transparent electrode includes an intermediate transparent electrode at least partially interposed between the first variable body and the second variable body, and
the second transparent electrode is a rear transparent electrode coated on at least a part of a rear surface of the second variable body.

6. The auto focusing device of claim 5, wherein the at least one lens includes one lens,
the first variable body and the second variable body are connected to the one same lens, and
the controller controls a position of the one lens in the thickness direction by applying a voltage to the front transparent electrode and the intermediate transparent electrode or by applying a voltage to the intermediate transparent electrode and the rear transparent electrode.

7. The auto focusing device of claim 1, wherein the at least one lens includes first and second lenses each including the front surface and the rear surface and arranged to have the same optical axis, the first variable frame supports the first lens, and the second variable frame supports the second lens.

8. The auto focusing device of claim 7, wherein positions of the first and second lenses are independently changed as a voltage is independently applied to the first variable frame and the second variable frame by the controller, such that the front surface and the rear surface of the first lens move independently of the front surface and the rear surface of the second lens.

9. The auto focusing device of claim 1, wherein the support frame is a glasses frame supporting the at least one lens through the variable frame,
wherein the auto focusing device further comprises a sensor attached to the glasses frame, the sensor sensing an inclination of the lens or a distance between an object and the lens, and
wherein the controller controls the focus of the at least one lens by applying a voltage to the transparent electrode, based on a sensing value of the sensor.

10. An auto focusing device comprising:
at least one lens including a front surface and a rear surface opposite the front surface;
a support frame;
a variable frame extending between the support frame and the at least one lens, the variable frame including a variable body supporting the at least one lens relative to the support frame, the variable body including electroactive polymer, and a transparent electrode coated on at least part of a surface of the variable body; and
a controller controlling a focus of the lens by applying a voltage to the transparent electrode,
wherein the variable frame includes a first variable frame and a second variable frame, the first variable frame arranged relative to the second variable frame to be closer than the second variable frame to a front side of the auto focusing device,
the transparent electrode includes a first transparent electrode coated on at least a part of a first variable body of the first variable frame and a second transparent electrode coated on at least part of a second variable body of the second variable frame,
the first variable body includes electroactive polymer,
the second variable body includes electroactive polymer,
the first transparent electrode is a front transparent electrode coated on at least a part of a front surface of the first variable body,
the transparent electrode includes an intermediate transparent electrode at least partially interposed between the first variable body and the second variable body, and
the second transparent electrode is a rear transparent electrode coated on at least a part of a rear surface of the second variable body.

11. An auto focusing device comprising:
at least one lens including a front surface and a rear surface opposite the front surface;
a support frame;
a variable frame extending between the support frame and the at least one lens, the variable frame including a variable body supporting the at least one lens relative to the support frame, the variable body including electroactive polymer, and a transparent electrode coated on at least part of a surface of the variable body; and
a controller controlling a focus of the lens by applying a voltage to the transparent electrode,
wherein the variable frame includes a first variable frame and a second variable frame, the first variable frame arranged relative to the second variable frame to be closer than the second variable frame to a front side of the auto focusing device,
the transparent electrode includes a first transparent electrode coated on at least a part of a first variable body of the first variable frame and a second transparent electrode coated on at least part of a second variable body of the second variable frame,
the at least one lens includes first and second lenses each including the front surface and the rear surface and arranged to have the same optical axis, the first variable frame supports the first lens, and the second variable frame supports the second lens, and
positions of the first and second lenses are independently changed as a voltage is independently applied to the first variable frame and the second variable frame by the controller, such that the front surface and the rear surface of the first lens move independently of the front surface and the rear surface of the second lens.

* * * * *